United States Patent [19]

Warbrick

[11] Patent Number: 4,737,006
[45] Date of Patent: Apr. 12, 1988

[54] OPTICAL FIBER TERMINATION INCLUDING PURE SILICA LENS AND METHOD OF MAKING SAME

[75] Inventor: Kevin J. Warbrick, Harlow, England

[73] Assignee: STC PLC, London, England

[21] Appl. No.: 862,855

[22] Filed: May 13, 1986

[30] Foreign Application Priority Data

May 16, 1985 [GB] United Kingdom ............... 8512386

[51] Int. Cl.⁴ ............... G02B 6/32; C03B 23/20; G01N 21/00
[52] U.S. Cl. ............... 350/96.18; 350/96.15; 350/96.20; 350/96.21; 350/96.34; 350/320; 65/4.2; 65/36; 65/37; 356/73.1; 356/400
[58] Field of Search ............... 350/96.10, 96.15, 96.18, 350/96.29, 96.20, 96.34, 96.21, 320; 250/227; 356/73.1, 400; 65/4.1, 4.2, 36, 37

[56] References Cited

U.S. PATENT DOCUMENTS

| | | | |
|---|---|---|---|
| 4,173,393 | 11/1979 | Maurer | 350/96.34 |
| 4,327,963 | 5/1982 | Khoe et al. | 350/96.18 |
| 4,456,330 | 6/1984 | Blüdaü | 350/96.18 |
| 4,509,827 | 4/1985 | Cowen et al. | 350/320 |
| 4,545,643 | 10/1985 | Young et al. | 350/96.20 |
| 4,561,719 | 12/1985 | Quan | 350/96.21 |
| 4,641,912 | 2/1987 | Goldenberg | 350/96.10 |
| 4,649,271 | 3/1987 | Hök et al. | 250/227 |
| 4,679,907 | 7/1987 | Campbell et al. | 350/320 |
| 4,690,500 | 9/1987 | Hayami et al. | 350/96.25 |

FOREIGN PATENT DOCUMENTS 59-229515 12/1984 Japan ............... 350/320

Primary Examiner—William L. Sikes
Assistant Examiner—Brian M. Healy
Attorney, Agent, or Firm—Lee, Smith & Zickert

[57] ABSTRACT

A single mode fiber expanded beam termination is formed by fusion splicing an undoped (pure) silica rod to a single mode fiber. The length of the rod controls the expanded beam diameter, and forms a lens on the free end of the undoped silica rod to collimate an output beam.

9 Claims, 1 Drawing Sheet

OPTICAL FIBER TERMINATION INCLUDING PURE SILICA LENS AND METHOD OF MAKING SAME

BACKGROUND OF THE INVENTION

This invention relates to optical fiber terminations and in particular to a single mode fiber expanded beam termination and methods of manufacturing them.

SUMMARY OF THE INVENTION

According to one aspect of the present invention there is provided a single mode fiber expanded beam termination comprising an undoped silica rod, one end of which is spliced to one end of a single mode fiber, the other end of the rod being formed as a lens.

According to another aspect of the present invention there is provided a method of manufacturing a single mode fiber expanded beam termination comprising the steps of fusion splicing one end of an undoped silica rod to one end of a single mode fiber and heat treating the other end of the undoped silica rod to form a lens.

BRIEF DESCRIPTION OF THE DRAWINGS

Embodiments of the invention will now be described with reference to the accompanying drawings, in which.

DESCRIPTION OF THE PREFERRED EMBODIMENT

Figure 1:
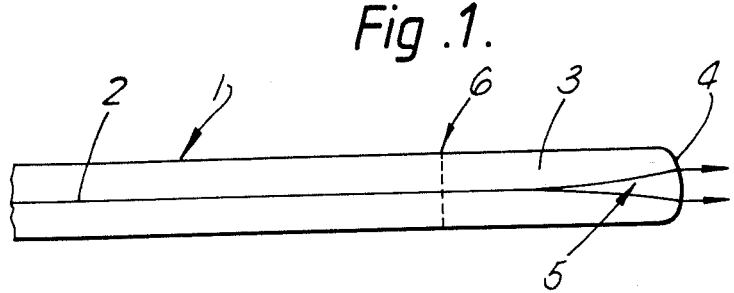
FIG. 1 illustrates schematically, a single mode expanded beam termination according to the present invention.

Referring first to FIG. 1, the single mode expanded beam termination comprises a silica based single mode fiber 1 with a fiber core 2 having an undoped (pure) silica rod 3, of substantially the same diameter attached to the fiber 1. The silica rod is attached to the fiber at a splice point 6 by an arc fusion technique. The free end of the silica rod 3 comprises a lens 4 which collimates the beam output from the fiber into the rod. The beam is unguided within rod 3 and diverges therein as indicated at 5. Thus the single mode expanded beam termination of FIG. 1 may be considered as comprising a silica rod lens arc fusion spliced to a single mode fiber to increase beam diameter and reduce beam divergence. Terminations have previously been made by drawing down the single mode fiber to a taper and forming a lens at the end of the tapered fiber. The use of a separate undoped rod spliced to the fiber serves to maintain the correct alignment between the fiber core and the lens by a simple fabrication process.

Figure 2:
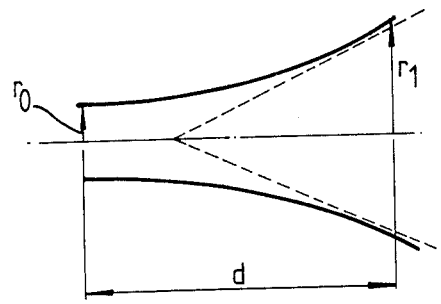
FIG. 2 illustrates the variation in radius of an unguided Gaussian beam.

The length of the rod 3 controls the final expanded beam diameter. The radius of an unguided Guassian beam behaves in the manner illustrated in FIG. 2. At the fiber core 2 the single mode spot size and thus the initial beam radius within the rod 3 is $r_o$. At a distance d into the rod 3 the radius $r_1$, of the diverging beam is given by $$r_1 = \frac{d\lambda}{\pi r_0} \left[ 1 + \frac{r_0^4 \pi^2}{d^2 \lambda^2} \right]^{\frac{1}{2}} \quad (1)$$

which approaches the Fraunhofer diffraction pattern for a gaussian aperture asymptotically.

For large value of d $$r_1 \simeq \frac{d\lambda}{\pi r_0} \quad (2)$$

In the case of a 125 μm diameter single mode fiber and a 125 μm diameter undoped silica rod fused thereto, large values of d are those greater than 200 μm and the error due to the approximation of (2) is of the order of 1.5%.

Preferably $r_1$ is chosen using the criteria that in order to avoid diffraction losses, the the beam radius must not be greater than half the lens radius ("Characteristics of Propagating Gaussian Beams" L. D. Dickson. Appl. Opt. 9 No. 8 August 1970).

In order to maintain continuity with the single mode fiber diameter of 125 μm the lens radius will be 62.5 μm and hence the beam radius must not be greater than approximately 30 μm. Using this and the field radius of the single mode $r_o$, which is approximately 5 μm, then d can be found from equations (1) or (2). Having allowed the beam to expand to the required size, the lens is needed to collimate the expanded beam. The required radius of curvature R of the single surface can be found from paraxial "ray" theory to a reasonable accuracy.

$$\frac{n_1}{S_o} + \frac{n_2}{S_i} = \frac{n_2 - n_1}{R} \quad (3)$$

where $n_1$ is the refractive index of the first medium (rod 3), $S_o$ is the length of the rod, $n_2$ is the refractive index of the second medium (air) and $S_i$ for parallel rays is $\infty$.

Figure 3:
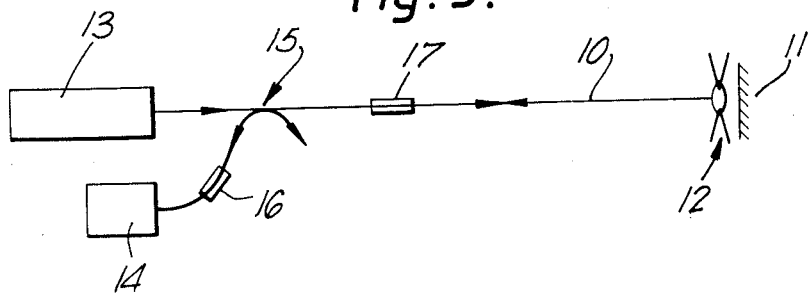
FIG. 3 illustrates schematically, the arrangement employed for performing lensing.
Figure 4:
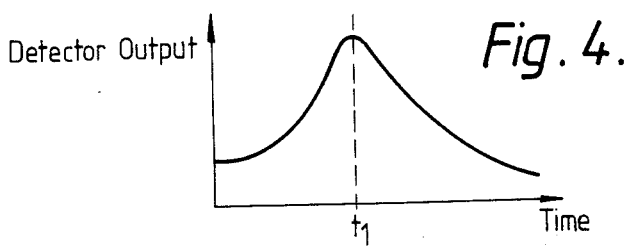
FIG. 4 shows the output of the detector of FIG. 3 as a variation with time.

The formation of the lens at the end of the rod may be achieved by the application of heat with the arrangement illustrated in FIG. 3. A single mode fiber with an undoped silica rod fused thereto 10 is disposed with the free end of the glass rod adjacent to a mirror 11 and in the range of electric arc apparatus 12 which will be employed to heat the end of the rod. The output of a light source 13, for example a 1.3 μm semiconductor laser, is coupled to the free end of the fiber. A detector 14 is coupled to the fiber by means of a 3 db coupler at 15. Cladding mode strippers 16 and 17 are provided in the fiber coupling the detector to the coupler and in the fiber between the coupler and the silica rod. The detector output is monitored while the free end of the rod is flame polished in the arc and results in rounding of the end of the rod. The detector output varies with the lens formation time as shown in FIG. 4 and is a maximum at $t_1$, the optimum lens formation time, that is when the rounding of the rod end has achieved the required radius of curvature.

The lensed fiber can be mounted in a ferrule using the established technology employed for lensed terminations, which is used to increase launch efficiency in semiconductor laser packages. This type of termination employs a "jewel" with a precisely central hole of known size to locate the fiber.

A pair of expanded beam terminations of the present invention may be used to form an expanded beam connection. The expanded beam terminations allow larger fiber to fiber spacing with minimal attenuation of transmitted signal, and allow relaxation of the required accuracy of the lateral alignment. Access to the propagating light for manipulation may be achieved within an expanded beam connector.

I claim:

1. A single mode fiber expanded termination comprising a pure silica rod one end of which is spliced to one end of a single mode fiber, the other end of the rod formed as a lens which is such as to produce a collimated output beam from an optical beam transmitted along the fiber towards its one end and expanded within said pure silica rod.

2. A termination as claimed in claim 1 wherein the single mode fiber and the pure silica rod are of substantially the same diameter.

3. A method of manufacturing a single mode fiber expanded beam termination comprising the steps of fusion splicing one end of a pure silica rod to one end of a single mode fiber and heat treating the other end of the pure silica rod to form a lens which is such as to produce a collimated output beam from an optical beam transmitted along the fiber towards its one end and expanded within said pure silica rod.

4. A method as claimed in claim 3 including the steps of disposing the other end of the pure silica rod adjacent to a mirror and coupling an optical signal to the other end of the single mode fiber, and wherein during the heat treating step the optical signal as reflected by the mirrors monitored by a detector, the heat treatment being terminated when the detector output is a maximum.

5. A method as claimed in claim 4, wherein the other end of the pure silica rod is disposed in the range of electric arc apparatus employed to flame polish it to form the lens.

6. A method of manufacturing a single mode fiber expanded beam termination comprising the steps of fusion splicing one end of a pure silica rod to one end of a single mode fiber, disposing the other end of the pure silica rod adjacent to a mirror, coupling an optical signal to the other end of the single mode fiber, employing a detector to monitor the optical signal as reflected by the mirror, and heat treating the other end of the pure silica rod, to form a lens thereat, whilst monitoring the reflected optical signal, the heat treatment being terminated when the detector output is a maximum, the lens thus formed being such as to produce a collimated output beam from an optical beam transmitted along the fiber towards its one end and expanded within said pure silica rod.

7. A method as claimed in claim 6, wherein the heat treatment is provided by electric arc apparatus, the other end of the pure silica rod being disposed in the range of the electric arc apparatus which serves to flame polish the other rod end to form the lens.

8. An expanded beam connector comprising a pair of spaced apart single mode fiber expanded beam terminations, each termination comprising a respective pure silica rod one end of which is spliced to one end of a respective single mode fiber, the other end of each rod being formed as a lens which is such as to produce a collimated output beam from an optical beam transmitted along the respective fiber towards its one end and expanded within the respective pure silica rod.

9. An expanded beam connector as claimed in claim 8, wherein the two lenses are spaced apart by a distance such as to allow light transmitted through the connector to be accessed, between the lenses, for manipulation thereof.

* * * * *